US006844720B1

(12) United States Patent
Pokrywka

(10) Patent No.: US 6,844,720 B1
(45) Date of Patent: Jan. 18, 2005

(54) METHOD AND APPARATUS FOR CALIBRATING A LINEAR VARIABLE DIFFERENTIAL TRANSFORMER

(75) Inventor: Robert J. Pokrywka, North Huntingdon, PA (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 0 days.

(21) Appl. No.: 10/216,465

(22) Filed: Aug. 12, 2002

(51) Int. Cl.[7] ............................................. G01N 25/16
(52) U.S. Cl. ...................... 324/202; 374/142; 374/149; 374/152; 374/179; 374/56; 33/702; 73/1.79
(58) Field of Search ........................... 324/202, 207.18; 73/1.79; 33/702; 374/55, 56, 142, 149, 152, 179

(56) References Cited

U.S. PATENT DOCUMENTS 3,919,879 A * 11/1975 Betz .............................. 374/56

5,689,447 A * 11/1997 Ward ............................ 702/99
5,767,670 A * 6/1998 Maher et al. ........... 324/207.18
5,789,918 A * 8/1998 Imai et al. .............. 324/207.18

* cited by examiner

Primary Examiner—Diego Gutierrez
Assistant Examiner—Stanley J. Pruchnic, Jr.
(74) Attorney, Agent, or Firm—Julia Cook Moody; Paul A. Gottlieb

(57) ABSTRACT

A calibration apparatus for calibrating a linear variable differential transformer (LVDT) having an armature positioned in au LVDT armature orifice, and the armature able to move along an axis of movement. The calibration apparatus includes a heating mechanism with an internal chamber, a temperature measuring mechanism for measuring the temperature of the LVDT, a fixture mechanism with an internal chamber for at least partially accepting the LVDT and for securing the LVDT within the heating mechanism internal chamber, a moving mechanism for moving the armature, a position measurement mechanism for measuring the position of the armature, and an output voltage measurement mechanism. A method for calibrating an LVDT, including the steps of: powering the LVDT; heating the LVDT to a desired temperature; measuring the position of the armature with respect to the armature orifice; and measuring the output voltage of the LVDT.

15 Claims, 4 Drawing Sheets

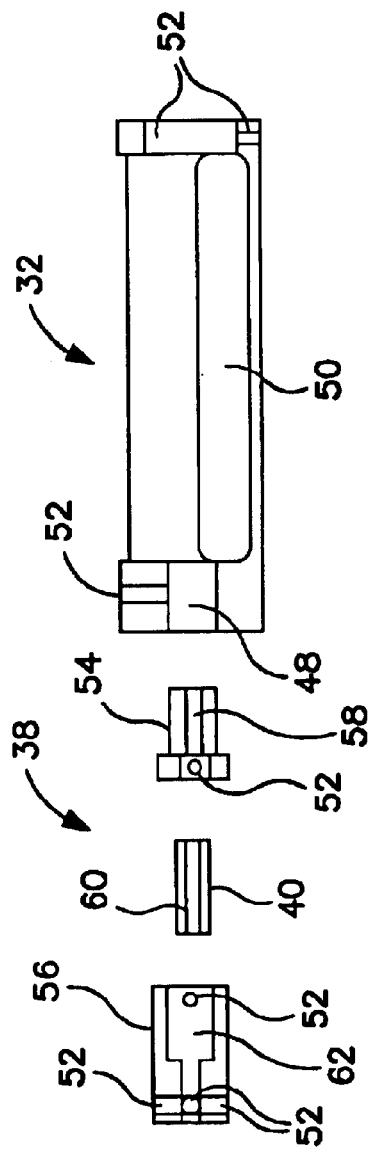
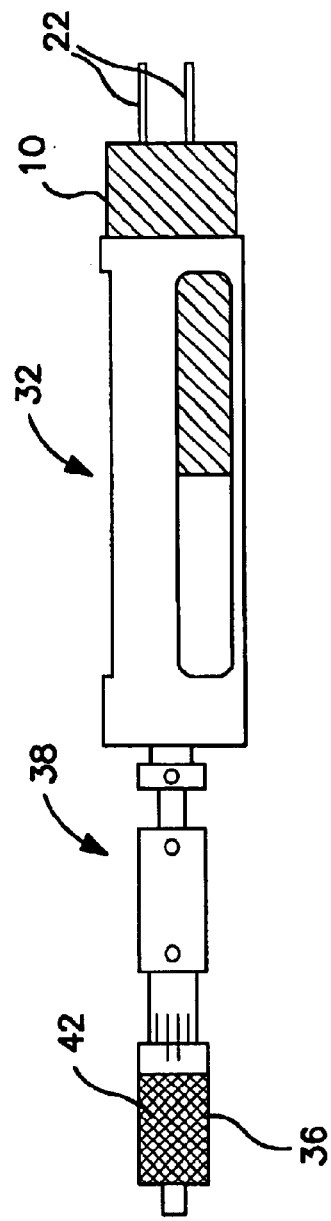
FIG. 3A
FIG. 3B

METHOD AND APPARATUS FOR CALIBRATING A LINEAR VARIABLE DIFFERENTIAL TRANSFORMER

CONTRACTUAL ORIGIN OF THE INVENTION

The United States Government has rights in this invention pursuant to a contract with the U.S. Department of Energy.

BACKGROUND OF THE INVENTION

1. Field of the Invention

The present invention relates generally to calibration techniques and apparatus for transformers and, in particular, to a method and apparatus for calibrating a linear variable differential transformer.

2. Description of Related Art

A linear variable differential transformer (LVDT) is a mutual inductance device (transformer) that produces an electrical output proportional to the displacement of a moveable core. Like other transformers, an LVDT consists of a primary coil, secondary coils (typically two), and a magnetic core or armature. An alternating current carrier excitation is applied to the primary winding or coil. It is this current in the primary coil that produces a varying magnetic field around the armature. The two secondary windings or coils are symmetrically spaced from the primary coil and are connected in a series opposing circuit. The magnetic field produced by the primary coil induces an alternating voltage in the secondary coils, which are also adjacent the moveable armature. The voltage of the induced signal from the secondary windings is related to the number of coils.

Motion of a non-contacting core or armature varies the mutual inductance of each secondary coil to the primary coil, which determines the voltage induced in each of the secondary coils. This voltage differential is linearly proportional to the displacement of the core and, therefore, the amplitude of the induced signal varies linearly with the displacement of the armature.

The two secondary coils have outputs which are balanced against each other and indicate the direction of the displacement of the core. Since the secondary windings are wound oppositely, an identical varying magnetic field applied to both windings creates an output voltage with the same amplitude but different sign (+/−). When the outputs from these secondary windings are added together, an equilibrium position and zero output signal are produced. This equilibrium position is typically when the armature or core is centered and undisplaced.

As discussed above, the primary design of the LVDT is that of a transformer. Therefore, an LVDT is subject to the same electrical characteristics as a transformer. For example, variance in temperature produces varying resistance. As temperature increases, resistance also increases. An increase in resistance increases the primary impedance resulting in a change in the induced secondary voltage, or output voltage. This variance dictates that the LVDT must have an accurate calibration prior to the start of testing or usage. Any significant change in its test environment temperature will affect the validity of its output voltage.

SUMMARY OF THE INVENTION

It is an object of the present invention to overcome the deficiencies of the prior art. It is another object of the present invention to provide a method and apparatus for calibrating an LVDT over a varying temperature range. It is another object of the present invention to provide a method and apparatus for obtaining a valid calibration curve at the precise temperature to which the LVDT will be exposed in working conditions. It is yet another object of the present invention to provide a calibration apparatus that is portable and/or handheld. It is yet another object of the present invention to provide a calibration apparatus that may be utilized in the test assembly, such that the associated instrumentation systems being used for testing can be incorporated into the calibration process, thereby making the resulting test data more reliable.

The present invention is a method and apparatus for calibrating a linear variable differential transformer. The present invention is directed to a calibration apparatus for calibrating an LVDT, where the LVDT has an armature positioned in an LVDT armature orifice. This armature or core is configured to move along an axis of movement. The calibration apparatus includes a heating mechanism having an internal chamber, a mechanism for measuring the temperature of the LVDT, and a fixture mechanism with an internal chamber configured to partially accept the LVDT. The fixture mechanism allows the LVDT to be securely positioned within the heating mechanism internal chamber. The calibration apparatus also includes a mechanism for moving the armature along the axis of movement, a mechanism for measuring the position of the armature with respect to the LVDT armature orifice, and a mechanism configured to measure an output voltage from the LVDT.

The present invention is also directed to a method of calibrating a linear variable differential transformer, where the LVDT has an armature position in an armature orifice. The method includes the steps of: (a) powering the LVDT, thereby producing an output voltage; (b) heating the LVDT to a desired temperature; (c) measuring the position of the armature with respect to the armature orifice; and (d) measuring the output voltage of the LVDT.

The present invention is also directed to a calibration apparatus for calibrating a linear variable differential transformer, where the LVDT has an armature positioned in an armature orifice. The calibration apparatus includes a means for powering the LVDT, thereby producing an output voltage, a means for heating the LVDT to a desired temperature, means for measuring the temperature of the LVDT, a means for measuring the position of the armature with respect to the armature orifice, a means for measuring the output voltage of the LVDT, and a means for moving the armature to a subsequent position along an axis of movement.

The present invention, both as to its construction and its method of operation, together with the additional objects and advantages thereof, will best be understood from the following description of exemplary embodiments when read in connection with the accompanying drawings.

BRIEF DESCRIPTION OF THE DRAWING(S)

FIG. 3a is a side sectional view of a fixture mechanism and an adapter prior to assembly;

FIG. 3b is a side view of the apparatus of FIG. 3a, as assembled with a micrometer and LVDT.

DESCRIPTION OF THE PREFERRED EMBODIMENT(S)

Figure 1:
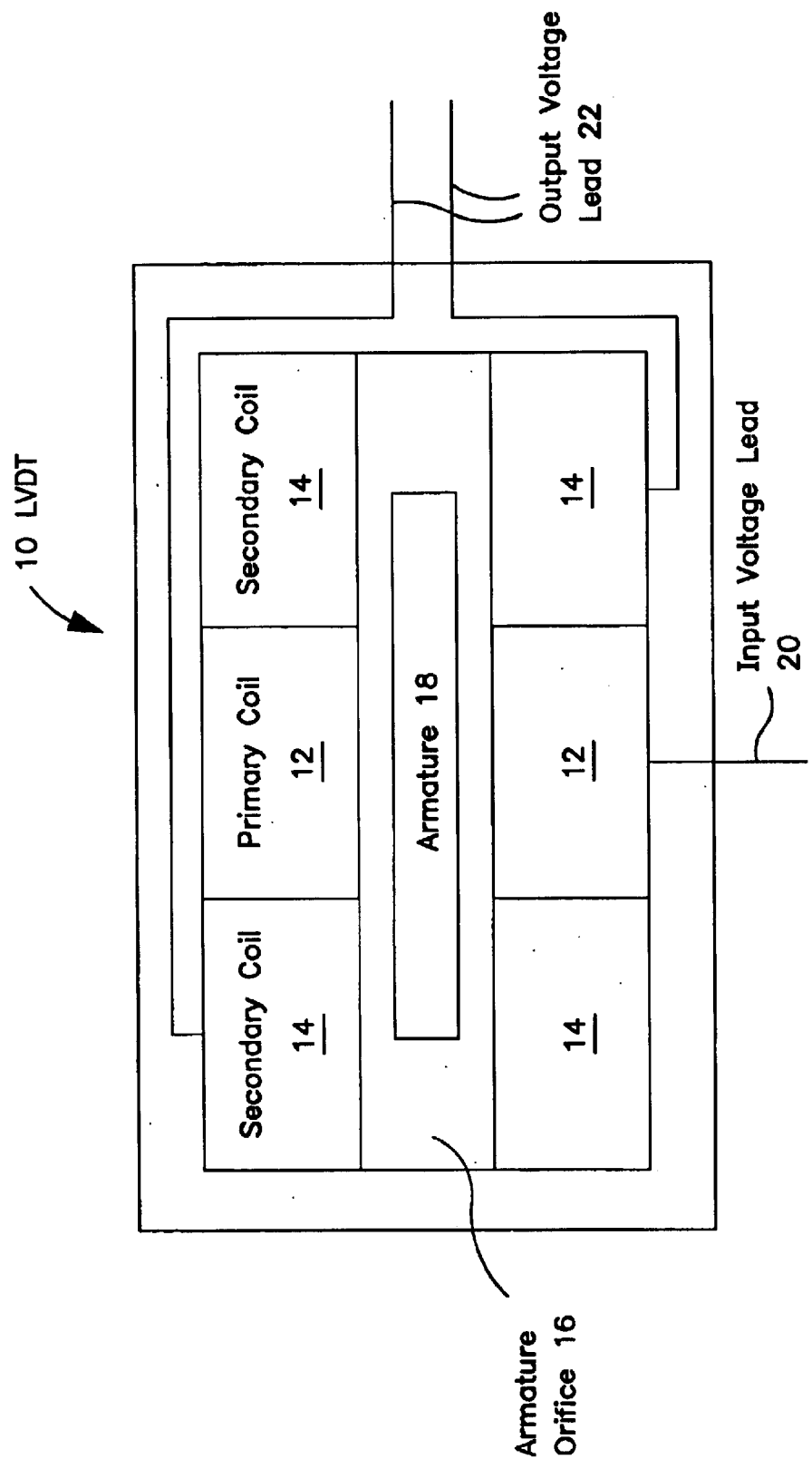
FIG. 1 is a schematic view of a linear variable differential transformer according to the prior art.

FIG. 1 illustrates a linear variable differential transformer (LVDT) 10 according to the present invention. As seen in FIG. 1, the LVDT 10 includes a primary coil 12 and at least two secondary coils 14. The primary coil 12, as well as the secondary coils 14, are typically tubular in construction, and the primary coil 12 is located centrally and is surrounded by the secondary coils 14. Due to the tubular construction of the primary coil 12 and the secondary coils 14, an armature orifice 16 is created.

Located within the armature orifice 16 is an armature 18, which is adapted to move axially through the armature orifice 16 along an axis of movement. An input voltage is applied to the primary coil 12 via an input voltage lead 20. Similarly, the resulting alternating voltage or output voltage is produced by the secondary coils 14 and is transmitted through output voltage leads 22.

Figure 2:
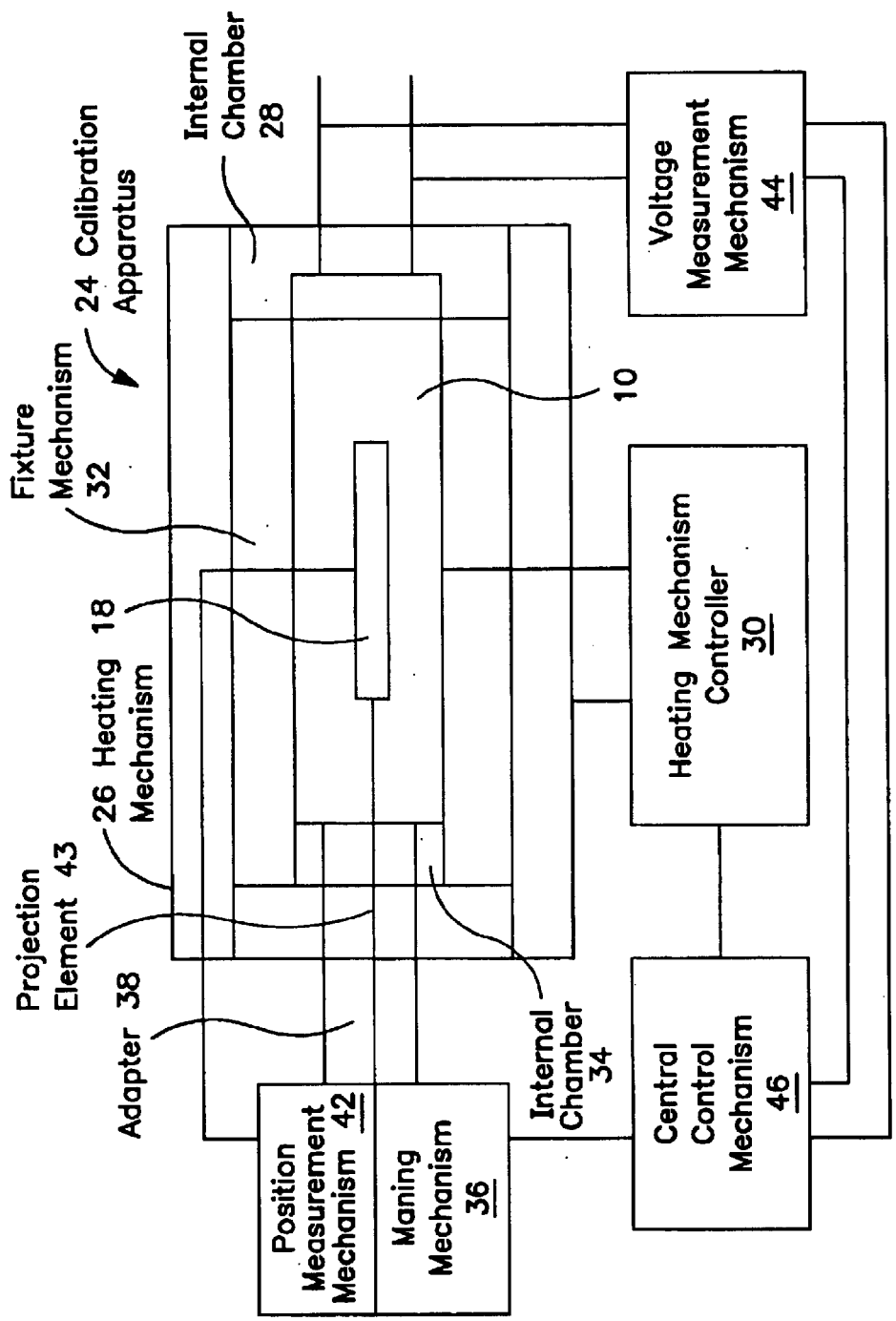
FIG. 2 is a schematic view of a calibration apparatus and system according to the present invention.

As the armature 18 is moved along the armature orifice 16, the varying magnetic field induces a varying output voltage. Since the LVDT 10 will be used in many different applications, the LVDT 10 must be calibrated for temperature to ensure accuracy in its resulting use. FIG. 2 illustrates the calibration apparatus 24 according to the present invention. The calibration apparatus 24 includes a heating mechanism 26 having an internal chamber 28. The heating mechanism 26, typically a furnace, may be manufactured from a stainless steel heater element, which is custom-fitted to a truncated 1½ inch schedule 40 stainless steel pipe. This assembly could be insulated, and heater leads connected to a heating mechanism controller 30. The heating mechanism controller 30 is able to receive an inputted desired heating temperature and power the heating mechanism 26, such that the desired temperature is maintained in the heating mechanism internal chamber 28.

In order to ensure that the proper or desired temperature has been reached or is being maintained, the heating mechanism controller 30 may also include a mechanism for measuring the temperature of the LVDT 10. The desired temperature, for accuracy purposes, is typically measured directly from the LVDT 10. However, it is also envisioned that the desired temperature be measured from the internal chamber 28 of the heating mechanism 26. Similarly, the mechanism for measuring the temperature of the LVDT 10 may be integral with the heating mechanism controller 30, or may be a separate measurement device, such as a thermocouple. The important aspect is the overall ability of the heating mechanism 26 to maintain its internal chamber 28 and, consequently, the LVDT 10 at a set specific temperature.

In order to securely position the LVDT 10 in the internal chamber 28 of the heating mechanism 26, a fixture mechanism 32 is utilized. This fixture mechanism 32 has a fixture mechanism internal chamber 34 for at least partially accepting and housing the LVDT 10. When the LVDT 10 is engaged with the fixture mechanism 32, the resulting assembly may be securely inserted in the heating mechanism into chamber 28. When inserted, the output voltage leads 22 of the LVDT 10 extend out or through one end of the heating mechanism 26.

In order to move the armature 18 along its axis of movement, a moving mechanism 36 is used. This moving mechanism 36 is in communication with the armature 18, and is able to move the armature 18 back and forth through the armature orifice 16. An adapter 38 is used to align the moving mechanism 36 with the LVDT 10, and is also used to secure the moving mechanism 36 to the fixture mechanism 32 in the internal chamber 28 of the heating mechanism 26. It is also envisioned that this adapter 38 includes an insulator portion 40 for eliminating or at least minimizing heat transfer between the heating mechanism 26 and the LVDT 10 to the moving mechanism 36.

A position measurement mechanism 42 measures the position of the armature 18 with respect to the LVDT armature orifice 16. It is envisioned that the position measurement mechanism 42 may be integral with or separate from the moving mechanism 36. It is also envisioned that the position measurement mechanism 42 may be a standard micrometer. For example, the moving mechanism 36 and/or the position measurement mechanism 42 may be combined as a micrometer, and the micrometer would have a projection element 43, which is attached to the armature 18. Moving the projection element 43 back and forth would likewise move the armature 18 back and forth.

The apparatus also includes a voltage measurement mechanism 44, which is configured to measure the output voltage from the LVDT 10 from the output voltage leads 22. A central control mechanism 46 may be used to receive and collect data corresponding to the temperature of the LVDT 10, the temperature of the heating mechanism internal chamber 28 of the heating mechanism 26, the position of the armature 18 with respect to the armature orifice 16 and/or the output voltage of the LVDT 10. When separate mechanisms are used, the central control mechanism 46 receives this data from the heating mechanism controller 30, the position measurement mechanism 42, and the voltage measurement mechanism 44. As discussed above, it is envisioned that any of the measurement-type mechanisms can be separate from or integral with the central control mechanism 46. For example, one master control mechanism can perform the tasks and have the same functionality as the above-discussed individual mechanisms.

The central control mechanism 46 is configured to present a calibration output to a user, based upon the temperature of the LVDT 10, or the temperature of the internal chamber 28 of the heating mechanism 26, the position of the armature 18 with respect to the armature orifice 16 and the output voltage from the LVDT 10. Still further, this calibration output may be a calibration curve plotting the position of the armature 18 against the output voltage from the LVDT 10 for any desired and set LVDT 10 temperature. In this manner, the LVDT 10 is calibrated by the calibration apparatus 24.

Figure 3C:
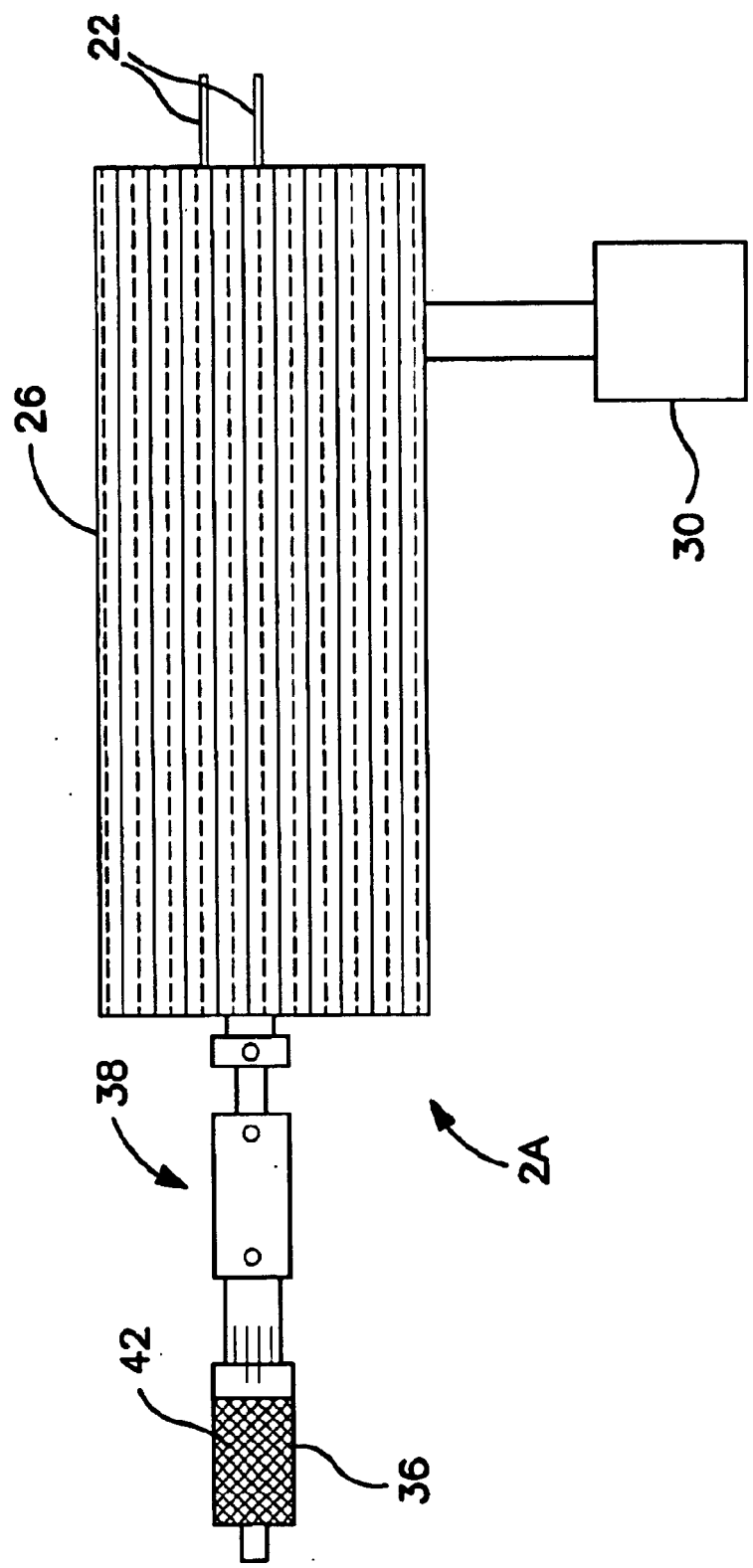
FIG. 3c is a side view of the apparatus of FIG. 3b, as engaged with a heating mechanism and a heating mechanism controller.

FIGS. 3a–3c illustrate one embodiment of the calibration apparatus 24 according to the present invention. Specifically, FIG. 3a shows an exploded view of the adapter 38 and fixture mechanism 32. The fixture mechanism 32, which has an internal chamber 34 for receiving the LVDT 10, also has an adapter orifice 48 on one end of the fixture mechanism 32. Further, the fixture mechanism 32 has multiple, and in this embodiment two, heat transfer orifices 50, which allow the heat from the internal chamber 28 of the heating mechanism 26 to directly impact and heat up the LVDT 10. The fixture mechanism 32 also has multiple securing orifices 52 for securely attaching the separate pieces together. In this example, three securing orifices 52 are used to hold the LVDT 10 in the internal chamber 34 of the fixture mechanism 32, and one larger securing orifice 52 is used to hold the adapter 38 in the adapter orifice 48.

In this embodiment, the adapter 38 includes three portions; a first fixture portion 54, the insulator portion 40 and a second fixture portion 56. The first fixture portion 54 is adapted to fit adapter orifice 48 and has a first fixture portion orifice 58 adapted to receive the insulator portion 40. Further, the first fixture portion 54 also has at least one securing orifice 52 for attaching the insulator portion 40 to the first fixture portion 54. In addition, this first fixture portion orifice 58 may be sized and shaped so as to allow the moving mechanism 36 (or the projection element 43) and/or the position measurement mechanism 42 to extend therethrough.

Similarly, in this embodiment the insulator portion 40 includes an insulator portion orifice 60, which also is able to allow passage of the moving mechanism 36 (or the projection element 43) and/or position measurement mechanism 42 therethrough. The second fixture portion 56 is similar to the first fixture portion 54, in that the second fixture portion 56 includes a second fixture portion orifice 62 for at least partially receiving the insulator portion 40 and also to allow the moving mechanism 36 (or the projection element 43) and/or the position measurement mechanism 42 to extend therethrough. Also, the second fixture portion 56 includes multiple securing orifice 52 (three in this embodiment) for fixing the insulator portion 40 to the second fixture portion 56, and also for attaching the moving mechanism 36 and/or the position measurement mechanism 42 to the second fixture portion 56.

As seen in FIG. 3a, each of the first fixture portion 54, the second fixture portion 56, and the insulator portion 40 include an orifice extending through each respective body, thereby allowing the moving mechanism 36 (or the projection element 43) and/or the position measurement mechanism 42 to extend through these orifices. In this manner, the overall adapter 38 aligns the moving mechanism 36 (or the projection element 43) and/or the position measurement mechanism 42 with the LVDT 10, and specifically the armature 18.

As seen in FIG. 3b, the moving mechanism 36 and/or the position measurement mechanism 42 is attached to the fixture mechanism 32 via the adapter 38. Next, the LVDT 10 is inserted in the internal chamber 34 of the fixture mechanism 32, and then the fixture mechanism 32 is inserted in the internal chamber 28 of the heating mechanism 26. FIG. 3c illustrates the calibration apparatus 24 as assembled.

The present invention is also directed to a method for calibrating a linear variable differential transformer. The method includes the steps of (a) powering the LVDT, thereby producing an output voltage; (b) heating the LVDT to a desired temperature; (c) measuring the position of the armature with respect to the armature orifice; and (d) measuring the output voltage of the LVDT. After the desired temperature is reached, and the position of the armature and output voltage measured, the armature 18 is moved to a subsequent position along the axis of movement. The armature 18 position and the output voltage are then measured and the data is recorded. This same process is used at a subsequent or second desired temperature, where the LVDT 10 is heated to this next desired temperature and data is received. This data is used to create a calibration curve, which plots the position of the armature 18 against the LVDT 10 output voltage for the desired first or subsequent temperature.

The present invention is also directed to a calibration apparatus for calibrating a linear variable differential transformer, and includes a means for powering the LVDT, thereby producing output voltage; means for heating the LVDT to a desired temperature; means for measuring the temperature of the LVDT; means for measuring the position of the armature with respect to the armature orifice; means for measuring output voltage of the LVDT; and means for moving the armature to a subsequent position along an axis of movement.

Overall the present apparatus and method effectively calibrate an LVDT 10. At different temperature stabilization points, calibration points are obtained, and the calibration apparatus 24 is used to measure these points over the LVDT 10 range of operation for a specific configuration. The LVDT 10 system is now calibrated and ready to take data. The present invention is an efficient, effective and portable LVDT 10 calibration apparatus 24 and method of calibrating an LVDT 10.

This invention has been described with reference to the preferred embodiments. Obvious modifications and alterations will occur to others upon reading and understanding the preceding detailed description. It is intended that the invention be construed as including all such modifications and alterations.

I claim:

1. A linear variable differential transformer (LVDT) calibration apparatus having an armature positioned in an LVDT armature orifice and configured to move along an axis of movement, the calibration apparatus comprising:
    a heating mechanism having an internal chamber;
    a mechanism configured to measure the temperature of the LVDT;
    a fixture mechanism having an internal chamber configured to at least partially accept the LVDT and configured to be securely positioned within the heating mechanism internal chamber;
    a mechanism configured to move the armature along the axis of movement;
    a mechanism configured to measure the position of the armature with respect to the LVDT armature orifice; and
    a mechanism configured to measure an output voltage from the LVDT.

2. The calibration apparatus of claim 1, further comprising a central control mechanism configured to receive data corresponding to at least one of the temperature of the LVDT, the temperature of the internal chamber of the heating mechanism, the position of the armature with respect to the LVDT armature orifice, and the output voltage from the LVDT.

3. The calibration apparatus of claim 2, wherein the central control mechanism is further configured to present a calibration output to a user, based upon at least one of the temperature of the LVDT, the position of the armature with respect to the LVDT armature orifice, and the output voltage from the LVDT.

4. The calibration apparatus of claim 3, wherein the calibration output is a calibration curve plotting the position of the armature against the output voltage from the LVDT for a desired LVDT temperature.

5. The calibration apparatus of claim 1, further comprising a heating mechanism controller configured to receive a desired heating mechanism temperature and to maintain the temperature in the heating mechanism internal chamber at the desired temperature.

6. The calibration apparatus of claim 1, further comprising an adapter configured to securely attach the mechanism configured to move the armature to the fixture mechanism.

7. The calibration apparatus of claim 6, wherein the adapter includes an insulator portion configured to at least minimize heat transfer between one of the heating mechanism and the LVDT to the mechanism configured to move the armature.

8. The calibration apparatus of claim 7, wherein the insulator portion is manufactured from a ceramic material.

9. The calibration apparatus of claim 1, wherein the mechanism configured to move the armature along the axis of movement is a micrometer.

10. The calibration apparatus of claim 1, wherein the mechanism configured to measure the temperature of the LVDT is a thermocouple.

11. The calibration apparatus of claim 1, wherein the fixture mechanism includes at least one orifice extending from a sidewall of the fixture mechanism to the fixture mechanism internal chamber and configured to permit heat transfer from the heating mechanism internal chamber to the LVDT.

12. A method of calibrating a linear variable differential transformer (LVDT) having an armature positioned in an LVDT armature orifice, the method comprising the steps of:

powering the LVDT, thereby producing an output voltage;

heating the LVDT to a desired temperature;

measuring the position of the armature with respect to the armature orifice;

measuring the output voltage of the LVDT;

inserting the LVDT at least partially in a fixture mechanism; and inserting the fixture mechanism in a heating mechanism.

13. A calibration apparatus for calibrating a linear variable differential transformer (LVDT) having an armature positioned in an LVDT armature orifice, comprising:

means for powering the LVDT, thereby producing an output voltage;

means for heating the LVDT to a desired temperature;

means for measuring the temperature of the LVDT;

means for measuring the position of the armature with respect to the armature orifice;

means for measuring the output voltage of the LVDT; and means for moving the armature to a subsequent position along an axis of movement.

14. The calibration apparatus of claim 13, wherein the means for moving the armature is a micrometer.

15. The calibration apparatus of claim 13, wherein the means for measuring the temperature of the LVDT is a thermocouple.

* * * * *